(12) United States Patent
Sheets et al.

(10) Patent No.: US 8,190,871 B2
(45) Date of Patent: May 29, 2012

(54) STORAGE DEVICE SELECTION AND SWITCHING SYSTEM

(76) Inventors: Kenneth Allen Sheets, Sunnyvale, CA (US); Jacqueline Louise Sheets, Sunnyvale, CA (US)

( * ) Notice: Subject to any disclaimer, the term of this patent is extended or adjusted under 35 U.S.C. 154(b) by 361 days.

(21) Appl. No.: 12/538,792

(22) Filed: Aug. 10, 2009

(65) Prior Publication Data

US 2010/0037043 A1    Feb. 11, 2010

Related U.S. Application Data

(60) Provisional application No. 61/188,585, filed on Aug. 11, 2008, provisional application No. 61/209,131, filed on Mar. 4, 2009.

(51) Int. Cl.
*G06F 15/177* (2006.01)
(52) U.S. Cl. .......................................................... 713/2
(58) Field of Classification Search ........................ 713/2
See application file for complete search history.

(56) References Cited

U.S. PATENT DOCUMENTS 6,816,982 B2 * 11/2004 Ravid .............................. 714/20

OTHER PUBLICATIONS

Verbist, Romtec Trios Hard Drive Selector, Aug. 7, 2001, http://www.overclockersonline.net/reviews/500088/.*
Calma et al., Trios II PX-920T2, Nov. 2002, http://www.octools.com/index.cgi?caller=articles/trios/trios2.html.*
Five7s, I Need Help . . . You Can Do It . . . , Jun. 15, 2004, http://forum.pcstats.com/showthread.php?17745-I-Need-Help . . . You-Can-Do-It . . . .*
MAKF1127, SATA switch?, Jul. 14, 2006, http://www.xtremesystems.org/forums/archive/index.php/t-107009.html.*
Indus technologies, IDEX 410 SATA, Sep. 12, 2007, http://web.archive.org/web/20070912213519/http://www.industechnologies.com/products_view.asp?CatID=168&SubCatID=0&SubSubCatID=0&ProductID=204.*
SATA Switches—(HDD) Hard Disk Drive Selectors Part 6, Dec. 8, 2008, http://jivebay.com/category/computers/hardware.*

* cited by examiner

*Primary Examiner* — Mark Connolly
(74) *Attorney, Agent, or Firm* — SilverSky Group, LLC (57) ABSTRACT

A storage device control system is disclosed for selecting a storage device to connect to a computer from a plurality of available storage devices and for controlling the manner in which the storage devices can be connected to the computer.

7 Claims, 5 Drawing Sheets

STORAGE DEVICE SELECTION AND SWITCHING SYSTEM

CROSS-REFERENCES TO RELATED APPLICATIONS

This is a utility patent application, taking priority from provisional patent application Ser. No. 61/188,585, filed Aug. 11, 2008, and provisional patent application Ser. No. 61/209,131, filed Mar. 4, 2009, which are incorporated herein by reference.

BRIEF DESCRIPTION OF THE INVENTION

The present invention is directed to storage device control systems and more particularly to a system for selecting a storage device to connect to a computer from a plurality of available storage devices and for controlling the manner in which the storage devices can be connected to the computer.

STATEMENTS AS TO THE RIGHTS TO INVENTIONS MADE UNDER FEDERALLY SPONSORED RESEARCH OR DEVELOPMENT

Not applicable.

REFERENCE TO A "SEQUENCE LISTING," A TABLE, OR A COMPUTER PROGRAM LISTING APPENDIX SUBMITTED ON A COMPACT DISK

Not applicable.

BACKGROUND OF THE INVENTION

With the advent of operating systems that can operate in conjunction with a variety of different manufacturers' microprocessors, there has been an increasing desire among computer users to run multiple operating systems on the same computer. For example, a user may desire to run different versions of MICROSOFT WINDOWS on their computer as well as other operating systems, such as LINUX. In order to run multiple operating systems, the computer must first boot from the desired operating system, which either requires users to create separate partitions on a single storage system for each operating system, or to use separate storage systems for each operating system. The problems with either of these solutions are that the user must modify their current hard drive in some way to make it work and that an issue occurring with one operating system, such as a user mistake or a virus, can carry over to the other operating system because both partitions of the single storage system or both of the separate storage systems are still powered and connected to the microprocessor, even if the operating system associated with them are not in use.

Various solutions have been developed to deal with the above issues; typically by attempting to control which storage device can be mounted/recognized by the computer, while keeping other storage devices connected to the computer from being mounted/recognized. One solution controls the power supplied to the various storage devices connected to the computer such that only a selected storage device has power and can therefore be seen by the computer. There are two drawbacks to this solution. When a simple power switch is utilized to control power to a storage device that is operating as the boot drive and the switch is moved while the computer is running, the storage device will lose power and cause the computer to crash.

An additional issue with this solution is that each storage device requires its own Serial Advanced Technology Attachment (SATA) port on the computer. If each of these storage devices is meant to be a boot device, each time the user changes the selected drive, the user will also have to change the computer's BIOS settings so as to cause the computer to boot from the newly selected storage device. It is possible to address the switching issue by having the computer latch the switch when power is applied, so that once the switch setting is read the attached storage device cannot be changed until power is removed from the computer. This does not, however, solve the issue with the BIOS not supporting the changed boot SATA port, or the fact that each storage device requires its own SATA port. As a result, implementation of this type of solution is best left to users that are intimately familiar with the workings of computers, leaving the solution unsuitable for consumer markets. And, as difficult as this issue is to solve on a desktop system, it is even more difficult to solve in laptop systems, that do not enable users to easily control which storage devices installed within the laptop can be powered or used to boot the computer.

With partitions and boot managers, there is the additional drawback in that the user must interact with the computer during the boot process in order to select the proper partition or drive that the computer will use. If the user does not respond in a relatively short period of time, the computer will then boot the default operating system (i.e., partition or drive) even if the user wanted another one. If this happens, the user must then reboot the computer and start the process all over again. This drive selection process not only requires the user to be present and attentive through the boot process, but since it requires interaction with the machine, it can be difficult or impossible to operate by a young child who can not read or necessarily understand the screen to select the proper drive.

DETAILED DESCRIPTION OF THE INVENTION

A system is described for selecting a storage device to connect to either a desktop computer or a laptop from a plurality of available storage devices that are logically isolated from one another and for controlling the manner in which the selected storage device can be connected to the computer. While it is currently possible to run multiple operating systems on a single computer and even on a single storage device of a computer, it is not possible to completely isolate problems that might arise through use of one operating system from affecting the storage device(s) of the computer and ultimately the operation of the computer itself. For example, some operating systems are more stable than others, but when both operating systems are installed on the same storage device, a problem with one can very likely affect the other. Even if the operating systems are operated off of separate storage devices, if those storage devices are connected to the computer at the same time, an issue in one storage device or in the computer can easily make its way into any connected storage device, even if the problem does not emanate from that storage device.

For example, when a parent allows a child to install and play gaming software on the parent's computer, the gaming software can change various settings of the computer, such as screen resolution, that will affect the parent's use of the computer later. Even if the child knows how to change the resolution setting back to the way it was prior to their use, it is unlikely that they will do so. More significantly, however, many such programs connect to the Internet to download data that affect how the program operates, but which can also include undesired code as well, such as viruses, Trojan horses, and the like. Instead of just impacting the storage device running the program in question, when multiple un-isolated storage devices are connected to the computer, the undesired code can now find its way into any other connected storage device and have a much more significant impact. Even if the other drives are not "mounted" on the computer, viruses can still affect the drive if it is attached to the computer.

The present invention was developed to address the need to boot different operating systems from different storage devices of a computer, such as hard disk drives, solid state drives, RAID drive arrays, and many other types of storage solutions, without having any code running on a selected storage device from having an effect on any other storage device also connected to the computer. The present invention is described herein as embodied in two different forms: a desktop computer environment and a laptop computer environment. While it is relatively easy to modify the hardware configuration of a desktop computer, due to the open nature of the hardware components, it is much more difficult to make such alterations within a laptop computer, thereby driving the need for different embodiments of the present invention.

Figure 1:
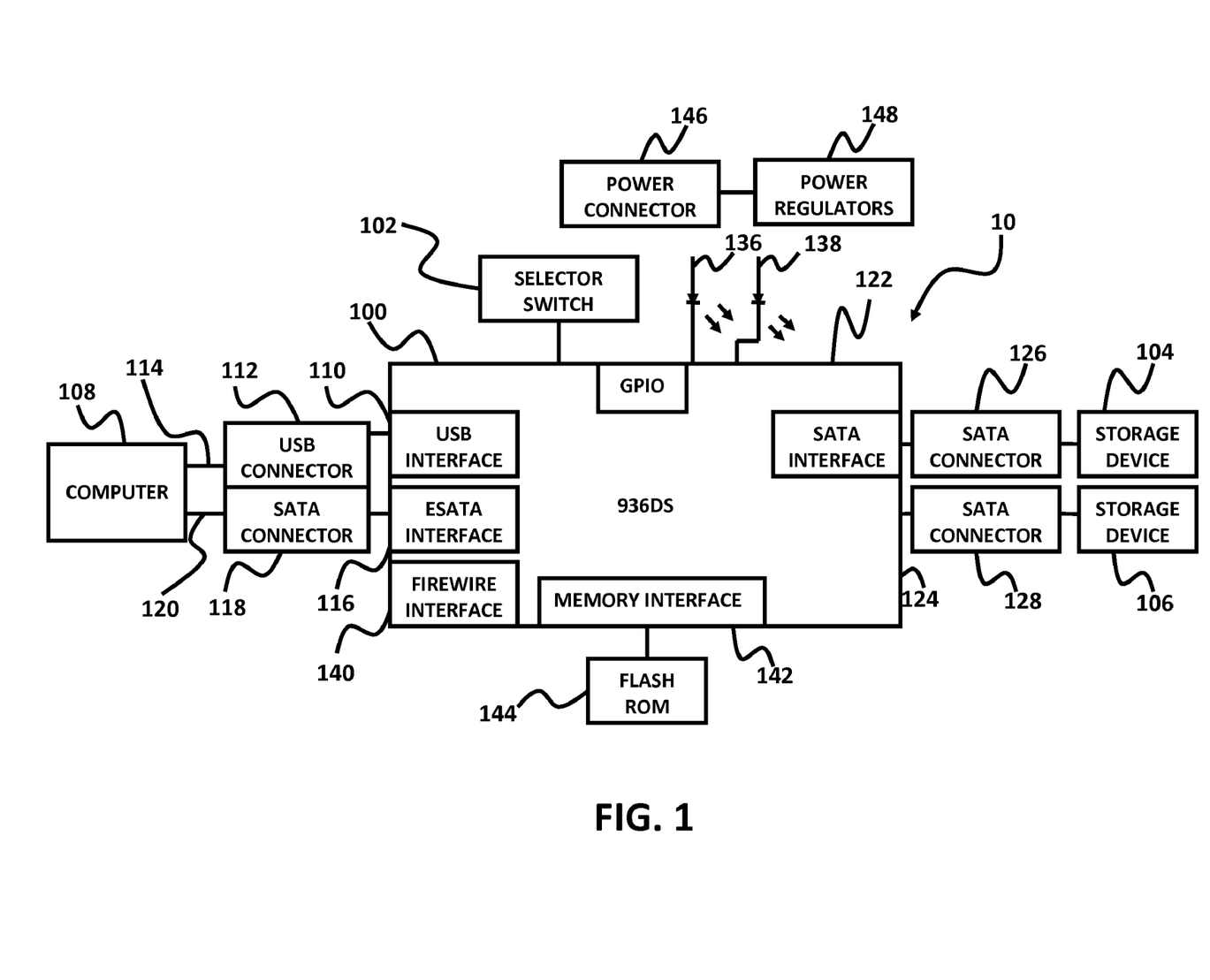
FIG. 1 is a block diagram of a storage device controller.

FIG. 1 provides a block diagram of a storage device selection system 10 including a controller 100 that serves as an interface between a selector switch 102, one or more storage devices 104 and 106, and a computer 108 (which could also be a gaming console, media player, or similar type of multimedia device), that captures a setting for the switch 102 (selecting a storage device 104 or 106) only when the computer 108 is booting (or rebooting), and that serves to electrically isolate the other storage devices from being accessible to the computer 108. The storage device selection system 10 is preferably located within a stand-alone housing (not shown) or is incorporated into the housing of the computer which it supports, whether a laptop or a desktop system. In the later case, the selection system 10, the storage devices 104 and 106, and the computer 108 are all part of a single integrated system.

For purposes of describing the present invention, a particular interface device, the OXFORD 936DS, manufactured by Oxford Semiconductor was used in the development of the present invention and is described herein as the controller 100, but many other types of devices could be used as the controller 100, as will be further described below. The 936DS includes a high-speed USB interface 110 that is connected to a USB connector 112. While the USB interface 110 is useful for programming the 936DS, the USB interface 110 may not be necessary in a commercial version of the selection system 10. If the USB interface 110 is used and the selection system 10 is part of a stand-alone housing, the USB connector 112 would be situated within a wall of the housing so that one end of a USB cable 114 could be plugged into the USB connector 112 from the outside of the housing, with the other end of the USB cable 114 connected to the computer 108. As the 936DS only supports the attachment of two storage devices, when the 936DS controller 100 is used, the selector switch 102 only needs to have two positions and could be a simple rocker or toggle switch, in addition to other types of switches.

If the selection system 10 is integrated into the computer, the connection between the USB connector 112 and the computer 108 would be internalized. The same is true with other connectors described below, which would be external connectors in a stand-alone configuration and internalized connectors in an integrated configuration. Whether the selection system 10 is a unit separate from, but connected to the computer 108, or integrated into the computer 108, does not change the basic principles of the invention disclosed herein.

The controller 100 also includes an External SATA (ESATA) interface 116 that is connected internally to a SATA connector 118, which is in turn connected to the computer 108 through a SATA cable 120. Two SATA interfaces 122 and 124 of the controller 100 connect to the storage devices 104 and 106 through SATA connectors 126 and 128 (and SATA cables), respectively. Any SATA interface could be an ESATA interface, or vice versa, so the two terms are used together herein (ESATA/SATA) below to indicate that one type of interface can be used in place of the other. The General Purpose Input Output (GPIO) pins 134 of the controller 100 connect to the selector switch 102 and two Light Emitting Diodes (LEDs) 136 and 138. Additional components of the controller 100 include a FIREWIRE (IEEE 1394) interface 140, which can be connected to either a 400 Mb/Sec or a 800 Mb/Sec FIREWIRE device, a memory interface 142, which connects to an external FLASH ROM 144 that includes firmware that can be used to operate the controller, and other general purpose inputs/outputs (not shown) that can be used under software control to implement various other functions not relevant to the present invention. In a commercial version of the controller 100, so as to reduce costs, the FireWire interface 140 would probably not be used, and the controller 100 would likely be programmed at the time of manufacture, thereby eliminating the need to reprogram the controller 100 at a later time. If the selection system 10 is a stand-alone device, rather than being incorporated into the motherboard of a computer or plugged into an expansion slot, it would also require a power connector 146 and power regulators 148, as shown in FIG. 1, to supply proper voltage and amperage levels to the other components of the selection system 10.

Figure 2:
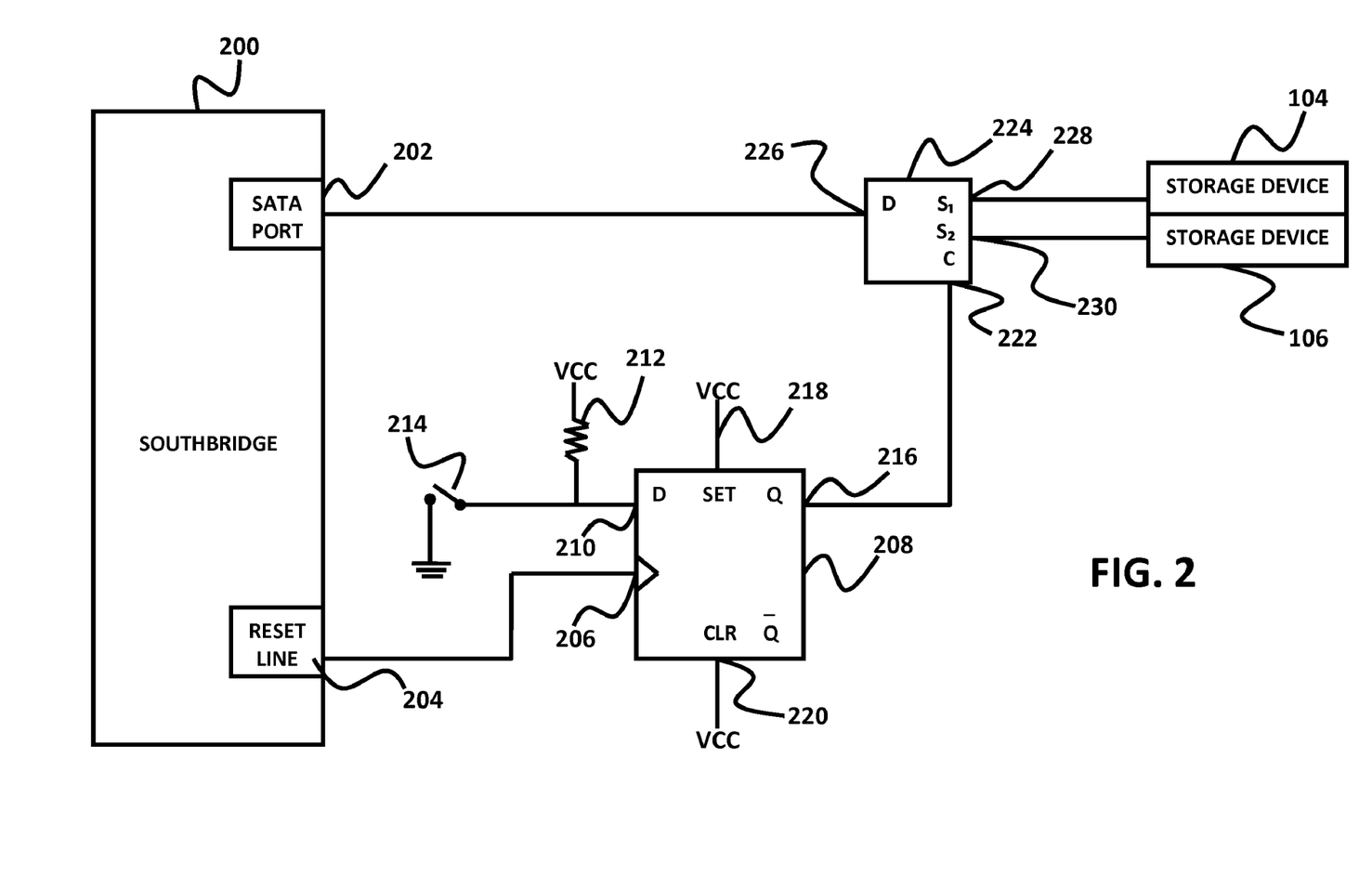
FIG. 2 is a schematic diagram illustrating an implementation of the present invention within a laptop computer or within the motherboard of the desktop computer.

FIG. 2 is a schematic diagram illustrating an implementation of the present invention within a laptop computer or within a desktop or similar type of personal or business computer. Such computers commonly include a chipset controller 200 called the "Southbridge" or "I/O Controller Hub" (ICH), which contains one or more SATA ports 202 and one or more system reset lines 204. The selection system 10 can be incorporated into the motherboard of the computer or configured to be installed in an expansion slot, such as a PCI or a PCIe slot, of the computer. In this embodiment, the reset line being used is the "PWRRDG" signal of the ICH 200.

The combination of the reset line 204 and the host disconnect adds a useful redundancy and is preferred. When the reset line 204 is used by itself, and in order to make sure the computer 108 will always properly switch and boot from the selected storage system, the reset signal is used to invoke the removal of the disk libraries, step 408 of FIG. 4 (further illustrated below). As noted, the reset line 204 can be used in this manner by itself, in place of watching to see if either the USB bridge or the ESATA/SATA bridge is lost, as noted below with respect to steps 406 and 412 of FIG. 4. As noted above, to provide extra redundancy, the reset line 204 could be monitored in addition to watching the communication bridges.

As noted above, the 936DS was used in the development of the present invention because it includes a number of additional components and features that ease the development process, but the 936DS is not the preferred controller for a commercial implementation. In a presently preferred embodiment of the present computer, the OXFORD 931DS, or a similar type of controller device, would be used in place of the 936DS. Like the 936DS, the 931DS can be configured as a USB bridge or an ESATA/SATA bridge (as further described below) to a ESATA/SATA storage device, but the 931DS only supports a single SATA storage device on its own. To enable the 931DS to support between two and four storage devices, the 931DS would need to be combined with a port multiplier, such as the MAXIM VSC7173 or J-Micron JMB320. The port multiplier could be connected to a controller through the GPIO pins 134. As noted below, a different controller 100, other than the 931DS, would need to be used to support RAID devices.

As previously noted, FIG. 2 illustrates an implementation of the present invention that uses a reset line of a Southbridge. In this implementation, the reset line 204 is connected to the clock input 206 of a D-FLOP 208, although a latch could be used in place of the D-FLOP to capture the user's switch selection (as further described below). The input 210 of the D-FLOP 208 is pulled high through a resistor 212 connected to a power source and is pulled low when switch 214 is closed and connected to a ground. When the D-FLOP 208 is configured in this manner and the reset signal is de-asserted, the output 216 of the D-FLOP 208 will be latched to the value on the input 206. The power source is also connected to the set 218 and clear/reset 220 to maintain proper operation of the D-FLOP 208.

The output 216 of the D-FLOP 208 is connected to the selection input 222 of a multiplexer 224. The data input 226 of the multiplexer 224 is the SATA line from the SATA port 202 of the controller 200. The data outputs 228 and 230 of the multiplexer 224 are connected via SATA lines to the storage devices 104 and 106, respectively. The multiplexer 224 electrically connects one of the two data outputs 228 or 230 to the data input 226 depending on the value of the selection input 222, which is set based on the setting of the switch 214 and the D-Flop 208, and electrically disconnects the unselected data output from the data input 226. The switch 214 could be a hardware switch that is brought out to the cabinet or housing of the computer, or could be a soft switch under program control of the computer 108. The controller 200 and the reset could also be program controlled utilizing methods well know in the art, such as firmware stored on FLASH ROM 144.

Figure 3:
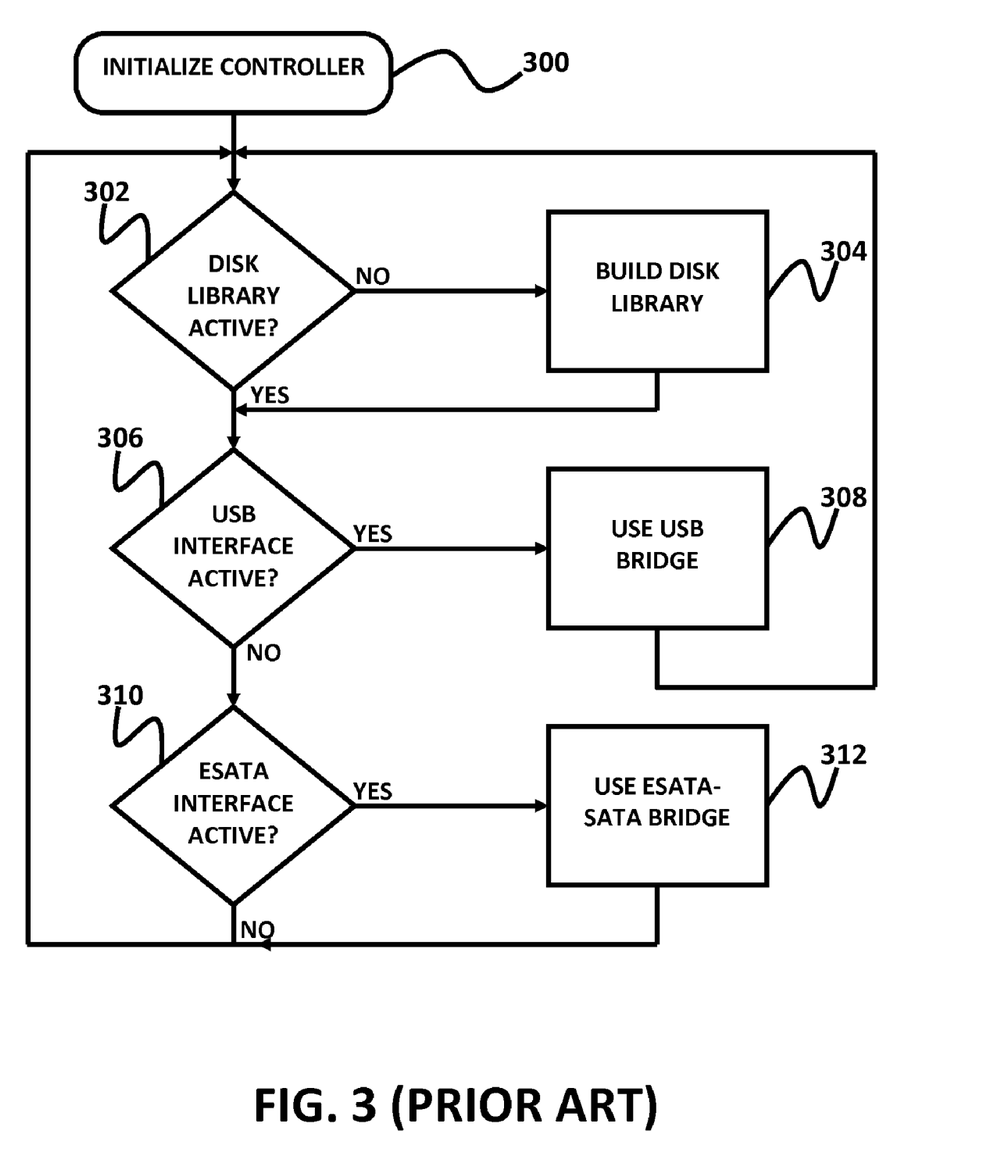
FIG. 3 is a flow chart illustrating the basic operation of the controller.

The flow chart illustrated in FIG. 3 explains the basic PRIOR ART operation of a controller, such as controller 100 or 200 when working with one or more storage devices. Under normal operation, the storage device controller will automatically build a disk library for each of the storage devices connected to it, such as by building either a RAID0 or RAID1 set for storage devices 104 and 106 when those storage devices are operating as a RAID set. If there is only one drive connected, there is no RAID set built and the disk library is built for just a single drive. Hence, as illustrated in FIG. 3, after the controller 100 is initialized in step 300, the controller checks to see if there is an active disk library, step 302, which corresponds to one or more drives that are configured to work with the controller, either as a single storage device or two or more drives configured as a RAID set.

If there is no active disk library, the controller 100 will build a disk library with any drives that are attached to the device, step 304. Once there is an active disk library, the controller 100 will check to see if there is a USB connection to the host computer 108, step 306. If a USB connection exists, the controller 100 will operate as a communication bridge between the USB interface and a ESATA/SATA interface, a USB-SATA bridge or USB bridge, step 308. If the USB bridge is lost, the controller 100 will loop back to step 302. If there was no USB connection at step 306, the controller will check to see if there is another active communication bridge, such as an active ESATA/SATA interface, step 310. If there is an active ESATA or SATA interface, the controller 100 will start operating as an ESATA-SATA bridge or ESATA bridge, step 312. If the ESATA bridge is removed, or if it did not exist in the first place, the controller 100 loops back to step 302. When the host computer 108 is rebooted or reset, the host disconnects from the interface and the USB-SATA or ESATA-SATA bridge functionality is ended. The controller 100 would detect the loss of the connection to either the USB or ESATA interfaces and loop back to step 302. The controller 100 would likewise detect the loss of an interface if the FireWire interface 140 was being utilized.

In each case, in step 302, the controller attempts to make use of the active disk library and only builds a new disk library if the disk library is not active. Since losing either the USB bridge or the ESATA bridge does not cause the disk library to be removed, the controller 100 will keep trying to use the active disk library, which makes the switching of connections between different storage devices using different operating systems problematic. If the connection to the storage devices is switched, the controller 100 will keep attempting to use the disk library for the previously connected storage device, unless the disk library has been removed, which is not something the average computer user has the ability to do.

Figure 4:
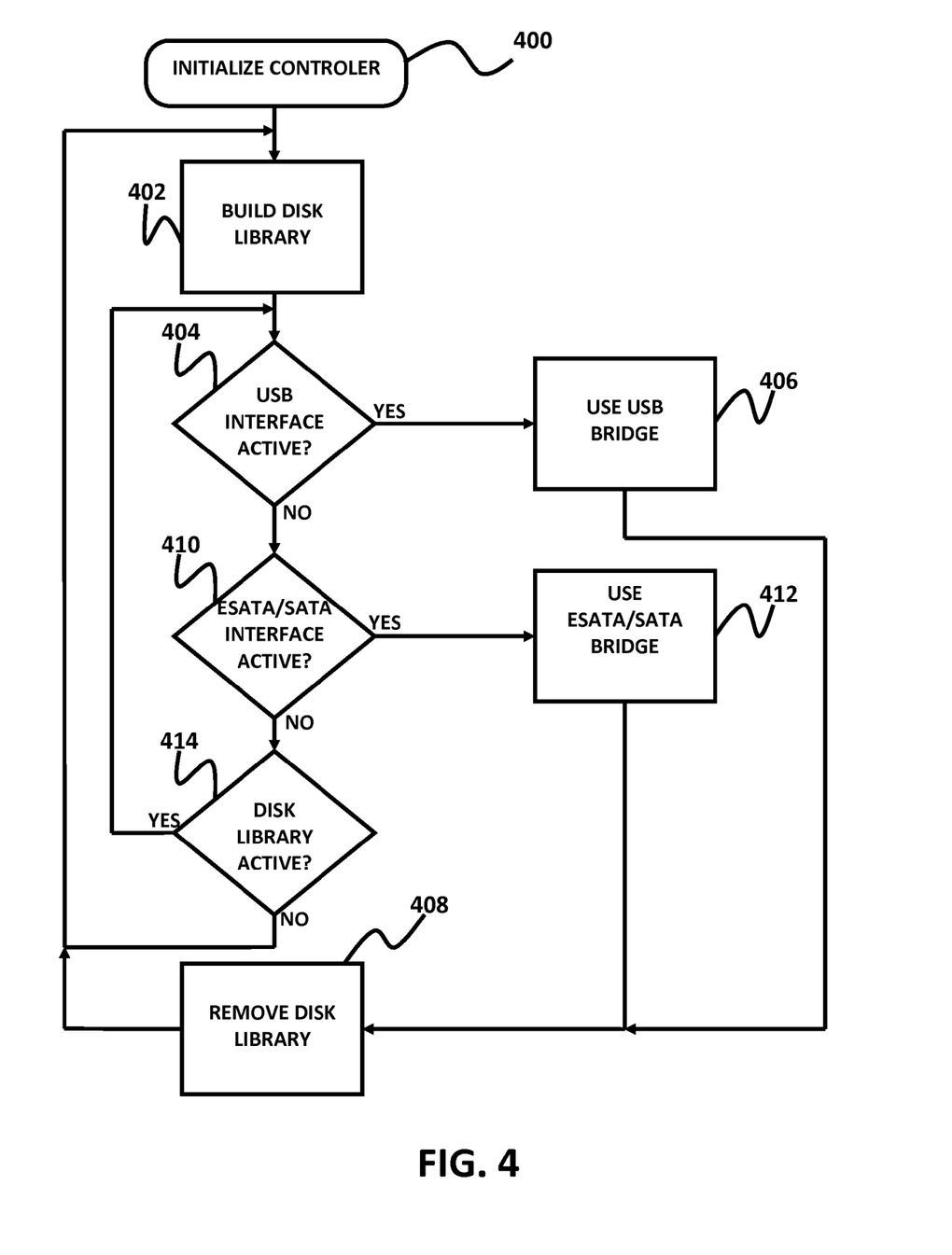
FIG. 4 is a flow chart illustrating an operation of the controller in accordance with the present invention.

In contrast to the prior art method described in FIG. 3, the controller 100/200 of the present invention reads the switch 102/214 setting before building the disk library (as further illustrated in FIG. 5 below) and only builds a disk library for the single storage device (or RAID set) that is presently logically connected to the host computer, while leaving the other storage device(s) unconnected. Hence, the process illustrated in FIG. 4 moves the initial step of checking to see whether a disk library is active to a later part of the process and adds an additional step of removing the disk libraries when either of the bridge functionalities is removed, or the reset line is activated (as noted above). As shown in FIG. 4, after the controller 100/200 is initialized, step 400, the disk library is built for the storage device selected by the switch 102/214, step 402.

After building the disk library, the controller 100/200 will check to see if there is a USB connection to the host computer 108, step 404. If a USB connection exists, the controller 100/200 will operate as a USB bridge, step 406. If the USB connection is lost, the controller 100/200 will remove the disk libraries, step 408, and loop back to step 402. If there was no USB connection at step 404, the controller 100/200 will check to see if there is an active ESATA or SATA interface, step 410. If there is an active ESATA/SATA interface, the controller 100/200 will start operating as an ESATA bridge, step 412. If the ESATA or SATA interface is removed, the controller 100/200 will remove the disk libraries, step 408, and loop back to step 402. If the ESATA/SATA interface did not exist in the first place, the controller 100/200 then checks to see if any disk libraries are active, step 414. If they are active, the controller 100/200 will loop back to step 404, and if not, the controller 100/200 will loop back to step 402 and build one for any storage device connected. When the host computer 108 is rebooted or reset, the USB-SATA and ESATA-SATA bridge functionality is ended and the disk libraries are removed so a different disk library can be built if a different storage device is selected on the reboot/reset.

Since the controller 100/200 removes the active disk library anytime the reset switch is activated or the bridge is lost, or both, it is therefore necessary to add the step of determining which storage device(s) are logically connected to the controller 100/200 before building a disk library. Unused storage devices are referred to as being isolated or not logically connected to the controller 100/200 whereas a storage device being used as the boot device is referred to as being logically connected. Even though a storage device may not be the boot device, it may still be physically and electrically connected to the controller 100/200. If the controller 100/200 has been programmed not to recognize a storage device (such as through the selection switch), that storage device is isolated or not logically connected and therefore does not exist for purposes of building the disk library. Naturally storage devices could be physically disconnected or electrically disconnected as well, but this is unnecessary if they can just as easily be otherwise isolated, such as logically disconnected.

Figure 5:
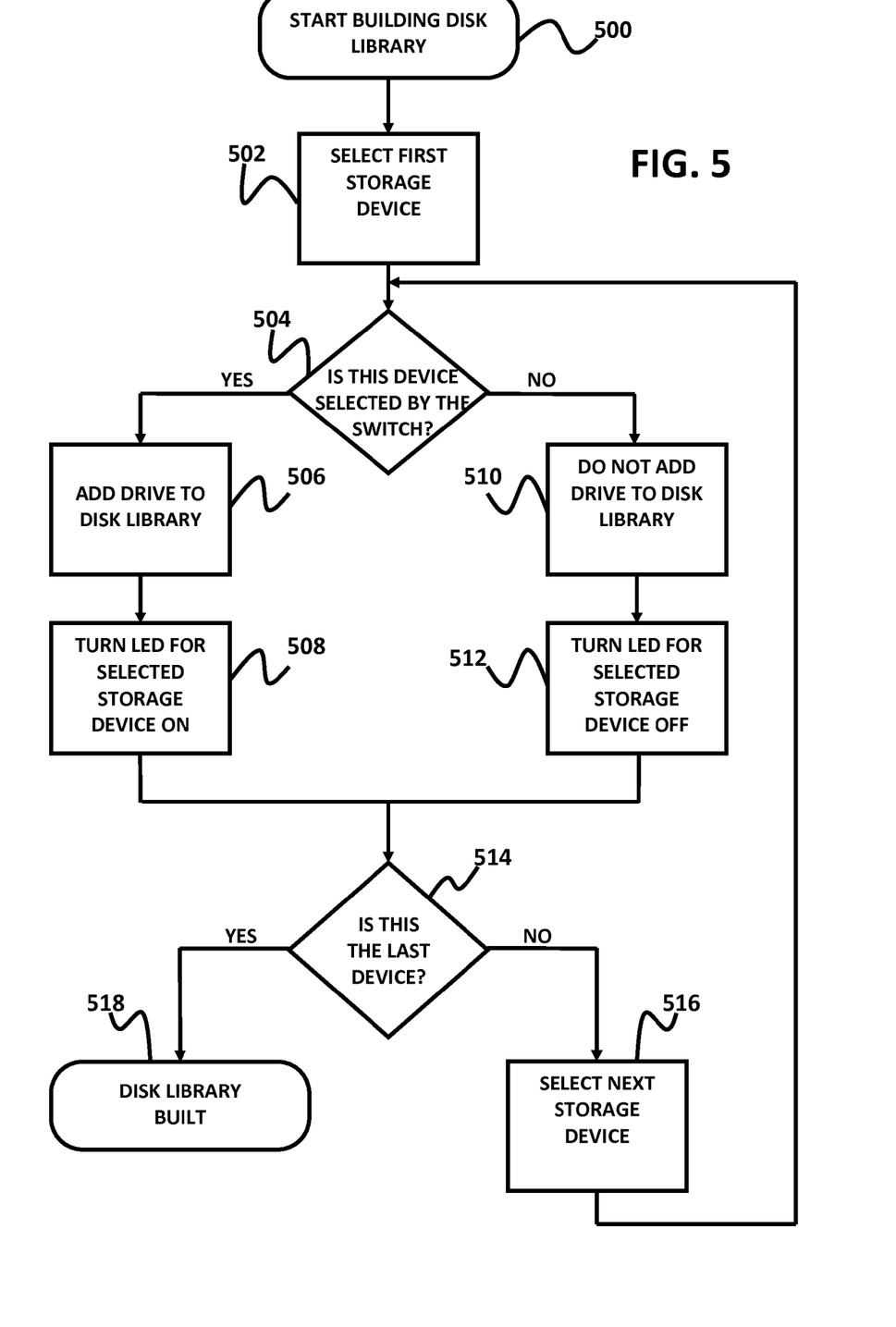
FIG. 5 is a flow chart further illustrating the building of the disk library first illustrated in FIG. 4.

FIG. 5 further illustrates the novel additional step of building the disk library, as noted in FIG. 4. When the disk library build process is started, step 500, the controller 100/200 checks for a storage device connected to controller 100/200, step 502 and then checks to see if the device has been selected by the switch 102/214, step 504, which logically connects the storage device to the controller 100/200. If the storage device was selected by the switch 102/214, the storage device is added to the disk library, step 506, and the LED 136 or 138 corresponding to the selected storage device is turned on, step 508. If the storage device was not selected, the storage device is not added to the disk library, step 510, and the LED corresponding to the unselected device is turned off, step 512.

In step 514, the controller 100/200 checks to see if the storage device added in step 506 or not added in step 510 was the last storage device selected by the selection switch 102/214 and therefore attached to a SATA interface/port, and loops back to step 504 if it was not, step 516. If the last storage device added/not added was the last storage device attached to the port, then the controller 100/200 will proceed to build the disk library, step 518, based on the storage devices added in step 506, and then continue on to step 404 of FIG. 4.

With respect to the embodiments described above, by not building a disk library that includes unselected drives, it is possible to treat those storage devices as if they simply do not exist, without having to remove the storage devices or even power the storage devices down. Since the computer 108 does not know that unselected storage devices exist, there is no confusion at the computer 108 as to which operating system to boot—it only sees one operating system and therefore only boots what it sees. At the same time, by latching the switch 102/214 to the selected storage device(s), the computer 108 will not crash and data will not be lost if the user were to change the switch setting while the computer 108 was on. The controller 100/200 simply ignores any change to the switch 102/214 setting until the computer 108 is being booted or rebooted. Hence, the user could change the switch setting while the computer is on, and if that switch setting was left unchanged when the computer was turned off, the next time the computer was turned on the selected storage device would be the boot device. Likewise, if the switch setting was changed while computer 108 was turned off, the computer would boot from the storage device selected by the switch 102/214 when the computer 108 was turned on again, regardless of what storage device was used for the boot device the last time the computer 108 was turned on.

Of course, there are a number of alternative embodiments that could also be employed in place of, or in addition to, the preferred embodiments described above. For example, the controller 100/200 could simply turn off the power to any storage device that was not selected, versus going through the process of selectively adding the storage devices that were selected by the switch. This would require additional power control circuitry and separate power cables and connectors for each storage device to be so controlled. It might also add to the wear and tear of the storage devices, causing them to fail sooner than they might otherwise fail. With power to the storage device shut off, the controller 100/200 will not see an ESATA/SATA port attached to a storage device as actually having a storage device attached, so the controller 100/200 will not attempt to add the storage device to the disk library. Likewise the controller 100/200 could disable the ESATA/SATA port for the unselected storage device, which would have the same effect as having no storage device attached to the port while the disk library building process was being performed.

In order to support a RAID configuration the OXFORD 936QS, or similar type of device, could be used in place of the 936DS or 931DS controller 100. The 936QS supports four storage devices and RAID devices, so a multi-position switch 102 may be required when this controller 100 is used. For example, the switch could be a multi-position rotary switch or slider switch instead of a two position rocker, toggle or slider switch. Although the 936QS and similar types of controllers support four storage devices, this does not mean that one storage device has to be attached to the controller 100 through each of its SATA ports. For example, three storage devices could be attached to three ports, where one of the storage devices is a two disk RAID array, or four storage devices could be attached where both devices are two disk RAID arrays, or four storage devices could be attached where one device is a single device and the other device is a three disk RAID array.

The above configurations, as well as other configurations could be accomplished through the use of jumpers on the controller 100, although this is not a consumer friendly solution. The controller 100 need not include a USB connector, but if it does, the host computer 108 could be connected to the controller 100 through the USB connection instead of the ESATA/SATA connection 116. Likewise, a FireWire interface 140 need not be included, but if it is, the host computer can be connected to the controller 100 through the FireWire interface 140 instead of the ESATA connection 116. Since different types and makes of controllers 100/200 may operate differently than the OXFORD controllers described above, different methods may be required to determine when different storage devices have been selected or the method of detecting when to change the attached storage device by recognizing the host disconnect may be required to be performed differently.

If one or more of the storage devices physically connected to the controller 100/200 are not selected and therefore logically connected, it may be desirable to send a spin down command to the storage devices to reduce power consumption.

Another advantage of the present invention is that by going through the controller 100/200 to select the boot drive, the ESATA/SATA device's name and serial number can be overridden, making it possible to present the computer with a name and serial number for whatever storage device is logically connected to the controller 100/200. This is advantageous because on some computer systems the BIOS in the computer cannot directly handle the storage device changing. If the expected storage device is not connected, but another one is, the BIOS requires the user to confirm that the "new" storage device is okay to be the boot drive. Many consumers would have a problem with knowing how to answer such a question.

With the present invention, the user can use storage devices from different manufacturers without going through the process of confirming the boot drive each time a storage device is changed. If the user were to just use a port selector with the storage device selection latched on (since there is no way to detect the reset over the SATA bus since there is no controller logic in the path), the user would need to work with the BIOS on each storage device change as well as having to completely power off the system each time the user wants to change boot drives.

While the present invention has been illustrated and described herein in terms of a preferred embodiment and several alternatives associated with comparing drawings, it is to be understood that the techniques described herein can have a multitude of additional uses and applications. Accordingly, the invention should not be limited to just the particular description and various drawing figures contained in this specification that merely illustrate a preferred embodiment and application of the principles of the invention.

What is claimed is:

1. A method for selecting and removing a boot device for a motherboard among a plurality of storage devices electrically connected to the motherboard, comprising the steps of:

determining one or more storage devices selected as the boot device among the plurality of storage devices;

building a disk library for the one or more storage devices determined to be the boot device;

isolating any storage devices among the plurality of storage devices determined not to be the boot device;

using a communication bridge between the boot device and the motherboard;

monitoring the communication bridge and a reset for the motherboard to determine if either the communication bridge is removed or the motherboard is reset; and removing the disk library if the communication bridge is removed or the motherboard is reset.

2. The method as recited in claim 1, wherein the step of determining includes the step of checking a setting of a switch to determine the one or more storage devices.

3. The method as recited in claim 2, wherein the switch is either a physical switch or software switch.

4. The method as recited in claim 1, further comprising the step of turning on a first indicator corresponding to the one or more storage devices selected as the boot device and turning off one or more indicators corresponding to any storage devices that are not the boot device.

5. The method as recited in claim 1, wherein the communication bridge is a SATA bridge, an ESATA bridge, a USB bridge or a FireWire bridge.

6. The method as recited in claim 1, wherein the plurality of storage devices include a disk drive device, a solid-state memory device or a RAID device.

7. The system as recited in claim 1, wherein the motherboard is for a portable computer, a non-portable computer, a gaming console, or a multimedia device.

* * * * *